March 22, 1955 H. F. STORM 2,704,823

MAGNETIC AMPLIFIER SYSTEM

Filed Feb. 29, 1952

Inventor:
Herbert F. Storm,
by Claude H. Mott
His Attorney.

2,704,823
Patented Mar. 22, 1955

2,704,823

MAGNETIC AMPLIFIER SYSTEM

Herbert F. Storm, Schenectady, N. Y., assignor to General Electric Company, a corporation of New York Application February 29, 1952, Serial No. 274,226

4 Claims. (Cl. 323—89)

This invention relates to magnetic amplifier systems, and more particularly to magnetic amplifier systems employing balanced pairs of magnetic amplifiers.

Generally speaking, the object of this invention is the provision of improved control circuit arrangements for magnetic amplifier systems employing balanced magnetic amplifiers.

A more specific object is the provision of control circuit means for applying a magnetic "bias" to a balanced pair of magnetic amplifiers when no separate biasing windings are present.

A further specific object is to provide control circuit means for magnetic amplifiers which provide an anticipatory effect, i. e., cause current in the control winding to change at a more rapid rate than otherwise would be the case for a given change in control signal voltage.

Other objects, features and advantages of my invention will be apparent from the subsequent description of preferred embodiments thereof, while the scope of the invention is set forth in the appended claims.

In carrying out my invention in one form, I provide a magnetic amplifier system which includes a pair of biphase self-saturating magnetic amplifiers in balanced or "push-pull" connection. Each magnetic amplifier includes a control winding, and the two control windings are serially connected to be energized from a source of control voltage. A pair of substantially identical serially connected impedances are connected in parallel with the two control windings. Each of the impedances has a greater time constant than one of the control windings. A source of unidirectional current to provide a magnetic bias for the magnetic amplifiers is connected between the common terminal of the control windings and the common terminal of the two impedances. The circuits thus formed by the impedances and the control windings permit the circulation of biasing current through the control windings simultaneously with the control current, so that no separate biasing windings are required, while the greater time constants of the impedances provide an anticipatory effect for changes in current in the control windings due to control voltage changes, for reasons which are set forth in detail hereinafter.

Figure 1:
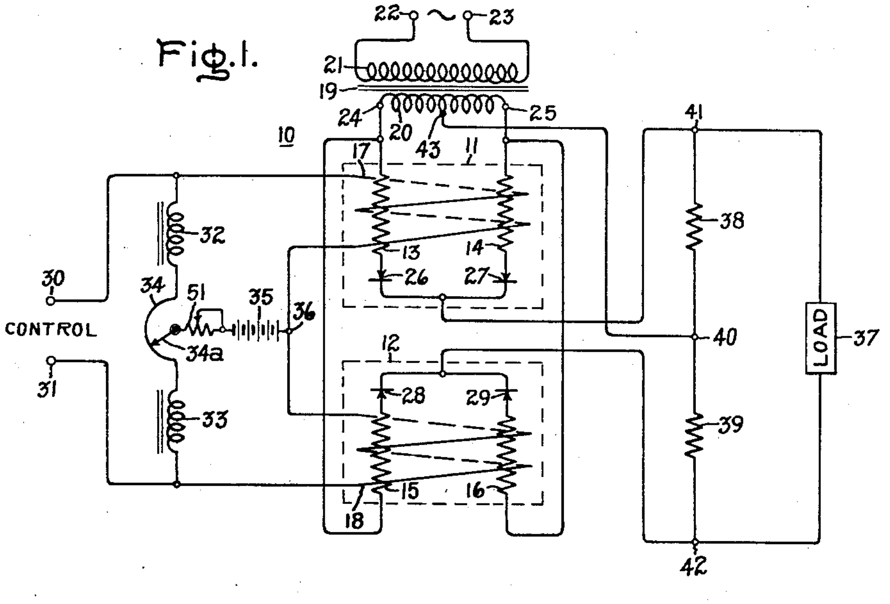
Figure 2:
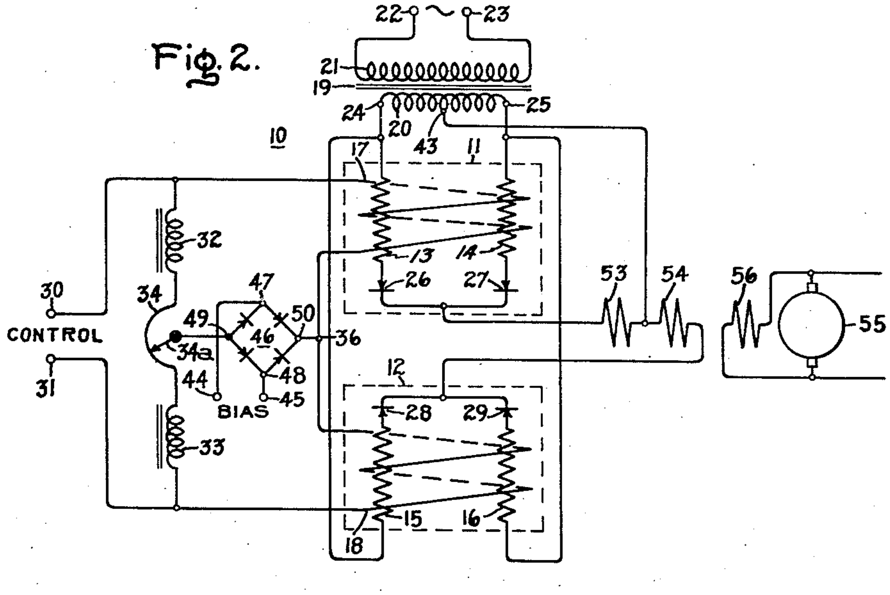

For a clearer and more complete understanding of my invention, reference should be had to the accompanying drawing, in which: Fig. 1 is an electrical circuit diagram embodying the invention in one preferred form, while Fig. 2 is an electrical circuit diagram embodying the invention in a second preferred form.

Referring to Fig. 1 of the drawing, there is shown a magnetic amplifier system, designated generally by the numeral 10, embodying a preferred form of my invention. System 10 includes a pair 11, 12 of substantially identical self-saturating biphase magnetic amplifiers in balanced or "push-pull" connection. Each self-saturating magnetic amplifier, or "amplistat," as they are sometimes called, includes a saturable core and each has a pair of load windings which are designated by the numerals 13 and 14 for magnetic amplifier 11 and 15 and 16 for magnetic amplifier 12. Each magnetic amplifier also includes a control or saturating winding, these being designated respectively by the numerals 17 for amplistat 11, and 18 for amplistat 12. The saturable cores for the magnetic amplifiers 11 and 12 are not illustrated in this schematic drawing but may be of the 3-legged type, the double toroid type, or other conventional construction.

The load windings of the magnetic amplifiers are supplied with alternating current from a suitable source such as a transformer 19. The load windings, and the load, are connected between the ends 24 and 25 and the midpoint 43 of secondary winding 20 of the transformer, while the primary 21 of the transformer may be connected to terminals 22 and 23 which represent any conventional source of alternating current.

Load windings 13 and 14 of amplistat 11 are connected respectively to opposite polarity terminals 24 and 25 of the transformer secondary winding, while load windings 15 and 16 of the other amplistat are similarly connected. Load windings 13 and 14 of amplifier 11 are positioned in additive flux producing relation on the saturable core of amplifier 11, and each of these load windings has a rectifier, preferably of the dry type, connected in series therewith so that current can flow through the load windings only during alternate half-cycles of the alternating voltage. These rectifiers are labeled 26 for load winding 13 and 27 for load winding 14. The other amplifier acts similarly and is provided with a rectifier 28 for load winding 15 and a rectifier 29 for load winding 16.

The currents in the two load windings of one magnetic amplifier saturate the core during successive halves of the alternating voltage cycle, and the time during each half-cycle at which saturation occurs is governed by the action of the control winding on each magnetic amplifier in affecting the initial partial saturation of the core. The reasons why the cores are initially partially saturated is brought out subsequently. The time during each half-cycle at which saturation occurs, in turn, governs the output current of each individual amplifier, such output current being the sum of the average currents through the two load windings. The output of the pair of balanced magnetic amplifiers is the resultant of the differential action of the two individual magnetic amplifiers, as explained in detail hereinafter.

The control windings 17 and 18 are serially connected but arranged to act oppositely on their respective amplistats. That is, a change in the current through the control windings produces an increase in the partial saturation of the core of one amplifier, while simultaneously producing a decrease in the partial saturation of the other. Both amplistats are normally biased, i. e., their cores are partially saturated, sufficiently that the amplistats will operate in the optimum portion of their operating range, and it is for this reason that a change in control current results in a decrease in the partial saturation of the core of one amplistat instead of a negative partial saturation. The current in the control windings 17 and 18 varies in accordance with variations in a control voltage applied at terminals 30 and 31.

In order to provide an anticipatory effect for the current in control windings 17 and 18, i. e., cause this current to change at a faster rate than would normally occur for a particular change in the applied control voltage, there are provided a pair of impedance devices connected in parallel with the control windings. In Fig. 1, these devices are illustrated by reactors 32 and 33. These reactors should be substantially identical, and each preferably should have a time constant considerably greater than the time constant of one of the control windings. By time constant is meant a value which is directly proportional to the ratio of the inductance of the device to its resistance, which value is determined by the time required after a predetermined change in the applied voltage occurs for a predetermined change to take place in the amount of current flowing through the device. A potentiometer resistor 34 may be connected between the impedances 32 and 33 to obtain zero output current from the amplistats for a zero control signal, by adjusting the relative amounts of bias provided for the two amplistats by the arrangement discussed in the next paragraph.

In order to provide for biasing magnetic amplifiers 11 and 12 without the use of separate biasing windings for this purpose, there is provided in the circuit shown in Fig. 1 a battery 35 which is connected between the common terminal 36 of the two control windings and slider 34*a* of potentiometer 34 representing an adjustable common terminal between resistors 32 and 33. The manner in which the battery 35 provides biasing for the amplistats is described in more detail hereinafter. A variable resistor 51 may be provided to adjust the operating point of the balanced magnetic amplifiers, by adjusting the magnitude of the current produced by the battery.

The load circuit which is designed to have an amplified current flow therethrough responsive to the current in control windings 17 and 18, is represented schematically by the numeral 37 in Fig. 1. A pair of identical resistors 38 and 39 are connected in shunt with load 37, and the common terminal 40 of these resistors is connected to the mid-point 43 of the transformer secondary winding. The other terminals 41 and 42 of the load circuit are connected respectively to amplistats 11 and 12.

In the operation of the circuit of Fig. 1, the excitation of transformer 19 by the connection of terminals 22 and 23 to a source of alternating current causes the energization of load windings 13, 14, 15 and 16 of the two amplistats due to the voltage appearing on the secondary winding 20 of the transformer. During the half-cycle of the alternating voltage wave when secondary terminal 24 of the transformer is positive, current flows through load winding 13 and rectifier 26 to load terminal 41, and thence through resistor 38 to terminal 40 and back to the mid-tap 43 of the transformer secondary. Simultaneously, current flows from secondary terminal 24 of the transformer through load winding 15 of the other magnetic amplifier, and then through rectifier 28 to terminal 42, and from here through resistor 39 to terminal 40 and back to terminal 43 of the transformer secondary winding. During alternate half-cycles when terminal 25 of the transformer secondary is positive, load windings 14 and 16 of the two amplistats carry current in a similar manner.

If there were no current in the windings 17 and 18 to affect the magnetic flux in the cores, and all parts of the two magnetic amplifiers and the associated alternating current excitation circuit were identical and balanced, the above described operation would produce voltage drops across resistor 38 and resistor 39 which were equal and opposite. This would make the potentials of terminals 41 and 42 equal and, therefore, no current would flow through load 37.

Furthermore, if the two amplistat cores were each partially saturated an equal amount in the same direction, no unbalance would result between terminals 41 and 42, even though the currents through the oppositely connected load windings of the two amplistats increased. As mentioned previously, such partial saturation or biasing is usually desirable, to cause the amplistats to operate under optimum conditions, and my invention provides for such biasing in a very simple manner, as will appear subsequently.

When control current flows serially through the two oppositely connected control windings, the partial saturation of the core of one amplistat is increased, which increases the current flowing through the load windings of that magnetic amplifier, while simultaneously the core flux and the current output of the load windings of the other amplistat are reduced. The resulting currents from amplistats 11 and 12 increase the potential of one of terminals 41 and 42, and simultaneously decrease the potential of the other, so that a current proportional to the total potential difference between these two terminals flows through load 37. A change in the current through the control windings affects the flux in the cores of the magnetic amplifiers in opposite senses so that a doubly amplified change results in the current in load 37 from the described balanced connection of the magnetic amplifiers.

The above-mentioned biasing of the amplistats is customarily done by means of separate bias windings on the amplistats similar to control windings 17 and 18. I have found, however, that such biasing can be accomplished by the use of the arrangement shown in Fig. 1 without the necessity of having separate bias windings on the magnetic amplifiers. With the connections shown in Fig. 1, the battery 35 circulates direct current through the control windings 17 and 18 in opposite directions, i. e. in parallel, in order to produce the desired biasing action. It will be understood that the resulting biasing action is approximately the same for each amplistat and in the same sense, since the two control windings are oppositely connected. The biasing current circuit for control winding 17 can be traced from common terminal 36 between the control windings, through control winding 17, and thence through reactor 32, a portion of potentiometer resistor 34 and adjustable resistor 51 back to the battery. The circuit for control winding 18 extends from terminal 36 through the control winding and thence through reactor 33, a portion of potentiometer 34, resistor 51, and back to the battery. With this arrangement the core of each of amplistats 11 and 12 is partially saturated or biased approximately the same amount, dependent upon the voltage of battery 35 and the resistance of the various elements in the battery circuits including windings 17 and 18, reactors 32 and 33, and resistors 34 and 51.

It will be understood from the foregoing that each of control windings 17 and 18 normally carries two components of current. One component is the control current which flows in series through the two windings as a result of control voltage impressed on terminals 30 and 31. The other component is the biasing current which flows through the two windings in parallel, i. e., in opposite directions. Thus, the control current and the biasing current add in one of the control windings and are subtractive in the other, whereby the net current in the former is relatively large and the net current in the latter is relatively small.

When a control voltage is applied between terminals 30 and 31, or when a change occurs in this control voltage, it is often desirable that the amplified current appearing in load 37 change as rapidly as possible to correspond to the new control voltage. It was explained previously how the balanced magnetic amplifier connection of Fig. 1 aids in producing a rapid change in the load current through the simultaneous increase in the current through one amplistat and the decrease in current through the other, producing double amplification. I have found that the response of the load current can be accelerated still further by making the time constants of impedances 32 and 33 considerably larger than the time constants of control windings 17 and 18. Then, when a change in control voltage occurs, such change affects the current in the control windings 17 and 18 at a more rapid rate than the current in impedances 32 and 33. If the control voltage increases, for example, the current through impedances 32 and 33 is relatively slow to build up because of their comparatively large time constants, and this forces the current initially to build up rapidly through the control windings 17 and 18 which have relatively small time constants. Subsequently, as the current gradually builds up through impedances 32 and 33, the increase in current to the control windings becomes less rapid. In this manner an anticipatory effect is obtained in the current through the control windings due to control voltage changes, and this effect is reflected in the load current.

A modified embodiment of my invention is illustrated by Fig. 2 of the drawing. In this figure corresponding parts bear the same reference numerals as in Fig. 1. In Fig. 2 the balanced magnetic amplifiers are shown as identical to those of Fig. 1. However, it should be understood that this invention is not limited to self-saturating magnetic amplifiers and is equally applicable to the non-self-saturating type. For example, the balanced non-self-saturating magnetic amplifiers shown in the Harder Patent 2,456,938 could be used in place of the self-saturating type illustrated and described herein, although such an arrangement normally provides less amplification than the self-saturating type.

The control circuit arrangement of Fig. 2 is different than Fig. 1 in that connections to a source of alternating biasing voltage, illustrated by terminals 44 and 45, and a bridge type rectifier 46 comprising four unidirectional conducting devices, preferably of the dry type, have been substituted for the battery of Fig. 1. The bridge rectifier 46 has alternating voltage terminals 47 and 48 which are connected to the source of biasing voltage, and direct current terminals 50 and 49 which are connected between common terminal 36 of the control windings and the slider 34*a* of the potentiometer 34. Biasing current adjusting resistor 51 of Fig. 1 is not shown in Fig. 2, but may be used if needed.

It will be readily understood that the combination of connections to a source of alternating biasing voltage and rectifier 46 provides unidirectional biasing current for control windings 17 and 18 in the same manner as battery 35 in Fig. 1. Such current is pulsating, however, and the resulting pulsations of the magnetic flux in the cores of the magnetic amplifiers has a detrimental effect on their amplifying characteristics. Such pulsations ordinarily reduce the amplification somewhat. I have found, however, that the use of reactors 32 and 33 in the biasing circuit provides a filtering action which counteracts, in large measure, the pulsations in the biasing current and the resulting pulsations in the magnetic flux, with the result that there is substantially no detrimental effect on the magnetic amplifiers due to the use of alternating biasing potential.

In order to provide one specific illustration of a use to which my magnetic amplifier system may be put, I have shown in Fig. 2 the outputs of the two balanced magnetic amplifiers connected to energize a pair of excitation windings 53 and 54 of a generator 55, in buck and boost relationship. As illustrated, the generator 55 is self-excited by means of a winding 56, and the windings 53 and 54 respectively buck and boost the action of winding 56. When the magnetic amplifiers are balanced, windings 53 and 54 carry equal currents, but the two windings are oppositely disposed on machine 55 so that the magnetomotive forces produced by the two windings 53 and 54 cancel each other. In the event of a change in the control voltage, however, the current in one of these windings decreases while the other increases simultaneously, thus producing a doubly amplified change in the excitation of generator 55 and rapidly changing the output voltage of generator 55 to a value corresponding with the input control signal.

While I have illustrated and described certain preferred embodiments of my invention, it will be understood that modifications thereof may be made by those skilled in the art. Therefore, it should be understood that I intend, by the appended claims, to cover all such modifications which fall within the true spirit and scope of my invention.

What I claim as new and desire to secure by Letters Patent of the United States is:

1. A magnetic amplifier system comprising a balanced pair of magnetic amplifiers each having a magnetic core, a pair of serially connected control windings positioned respectively on said magnetic cores and arranged to affect oppositely the magnetic flux in said cores, connections to a source of control voltage for energizing said control windings, a pair of substantially identical impedances serially connected in shunt with said control windings, said impedances having considerably greater time constants than the said control windings, and connections to a source of unidirectional current connected between the common terminal of the said control windings and the common terminal of the said impedances whereby to circulate biasing current through said control windings independently of the said control voltage source.

2. A magnetic amplifier system comprising a pair of self-saturating magnetic amplifiers in push-pull connection each having a magnetic core, a pair of serially connected control windings positioned respectively on said magnetic cores and arranged to affect oppositely the saturation of said cores, connections to a source of control current for energizing said control windings, a pair of substantially identical serially connected reactors connected in shunt with said control windings, said reactors having considerably larger time constants than the said control windings, and connections to a source of unidirectional current connected between the common terminal of the said control windings and the common terminal of the said reactors whereby to circulate biasing current in opposite directions through said control windings independently of said control current source.

3. A magnetic amplifier system comprising a balanced pair of magnetic amplifiers each having a magnetic core, a pair of serially connected control windings positioned respectively on said magnetic cores and arranged to simultaneously oppositely affect the magnetic saturation of said cores, connections to a source of control voltage for energizing said control windings, a pair of substantially identical reactors serially connected in shunt with said control windings, said reactors having considerably larger time constants than the said control windings, a rectifier device having alternating voltage input terminals and direct current output terminals, connections to a source of alternating biasing potential connected to said alternating voltage terminals, said direct current terminals being connected respectively to the common terminal of said control winding and the common terminal of the said reactors whereby to circulate biasing current through the said control windings in parallel independently of the said control voltage source.

4. A magnetic amplifier system comprising a pair of substantially identical self-saturating magnetic amplifiers in balanced connection each having a magnetic core, a pair of serially connected control windings positioned respectively on said magnetic cores and arranged to simultaneously oppositely affect the magnetic saturation of said cores, connections to a source of control voltage for energizing said control windings, a pair of substantially identical impedances serially connected in shunt with said control windings, said impedances having considerably larger time constants than the said control windings, a potentiometer resistor connected between said impedances, a bridge type rectifier device having alternating voltage input terminals and direct current output terminals, one of said direct current terminals being connected to the common terminal of the said control windings and the other of said direct current terminals being connected to the slider of said potentiometer resistor, and connections to a source of alternating biasing voltage connected to the alternating voltage terminals of the said rectifier device whereby to circulate biasing current through said control windings in opposite directions independently of the said control voltage source.

References Cited in the file of this patent

UNITED STATES PATENTS 2,027,312 FitzGerald ---------------- Jan. 7, 1936
2,414,936 Edwards et al. ----------- Jan. 28, 1947

OTHER REFERENCES

"Principles of Magnetic Amplifiers in Control and Measuring Technology," volume 19 (1940), No. 3, pages 234, 235 relied on.